United States Patent [19]
Anderson et al.

[11] Patent Number: 5,481,634
[45] Date of Patent: Jan. 2, 1996

[54] CONNECTOR FOR OPTICAL FIBER

[75] Inventors: Jerry M. Anderson, Austell; Norman R. Lampert, Norcross; Robert W. Mock, Jr., Lawrenceville, all of Ga.

[73] Assignee: AT&T Corp., Murray Hill, N.J.

[21] Appl. No.: 265,291

[22] Filed: Jun. 24, 1994

[51] Int. Cl.⁶ .................................................. G02B 6/36
[52] U.S. Cl. ................. 385/76; 385/55; 385/56; 385/60; 385/77; 385/78
[58] Field of Search ................. 385/76, 77, 78, 385/81, 84, 85, 86, 87, 88, 89, 92, 139, 55, 56, 60

[56] References Cited

U.S. PATENT DOCUMENTS

| | | | |
|---|---|---|---|
| 3,761,869 | 9/1973 | Hardesty eet al. | 439/418 X |
| 3,954,320 | 5/1976 | Hardesty | 439/418 X |
| 4,687,291 | 8/1987 | Stape et al. | 385/60 X |
| 4,762,388 | 8/1988 | Tanaka et al. | 385/60 X |
| 4,787,706 | 11/1988 | Cannon, Jr. et al. | 385/59 X |
| 4,793,683 | 12/1988 | Cannon, Jr. et al. | 385/60 X |
| 4,850,670 | 7/1989 | Mathis et al. | 385/68 X |
| 4,934,785 | 6/1990 | Mathis et al. | 385/68 X |
| 5,071,219 | 12/1991 | Yurtin et al. | 385/78 |
| 5,157,749 | 10/1992 | Briggs et al. | 385/60 |
| 5,212,752 | 5/1993 | Stephenson et al. | 385/78 |
| 5,224,186 | 6/1993 | Kishimoto et al. | 385/78 |
| 5,268,982 | 12/1993 | Schaffer et al. | 385/86 |
| 5,287,425 | 2/1994 | Chang | 385/60 X |
| 5,313,540 | 5/1994 | Ueda et al. | 385/78 |
| 5,381,498 | 1/1995 | Bylander | 385/83 |

*Primary Examiner*—Brian Healy
*Attorney, Agent, or Firm*—Michael A. Morra

[57] ABSTRACT

A connector for optical fibers includes a cylindrical glass ferrule installed in a plastic base member to form a fiber-holding structure. This structure includes a small passageway along its central axis for holding an optical fiber, and is mounted within a dielectric housing that includes an opening at one end thereof from which the glass ferrule protrudes. A cylindrical spring surrounds the base member and interacts with an interior surface of the housing to urge the glass ferrule outward from the opening in the housing. The housing further includes a spring latch which is located on a single side surface thereof, which is manually operable and used to lock the connector to an associated receptacle.

21 Claims, 5 Drawing Sheets

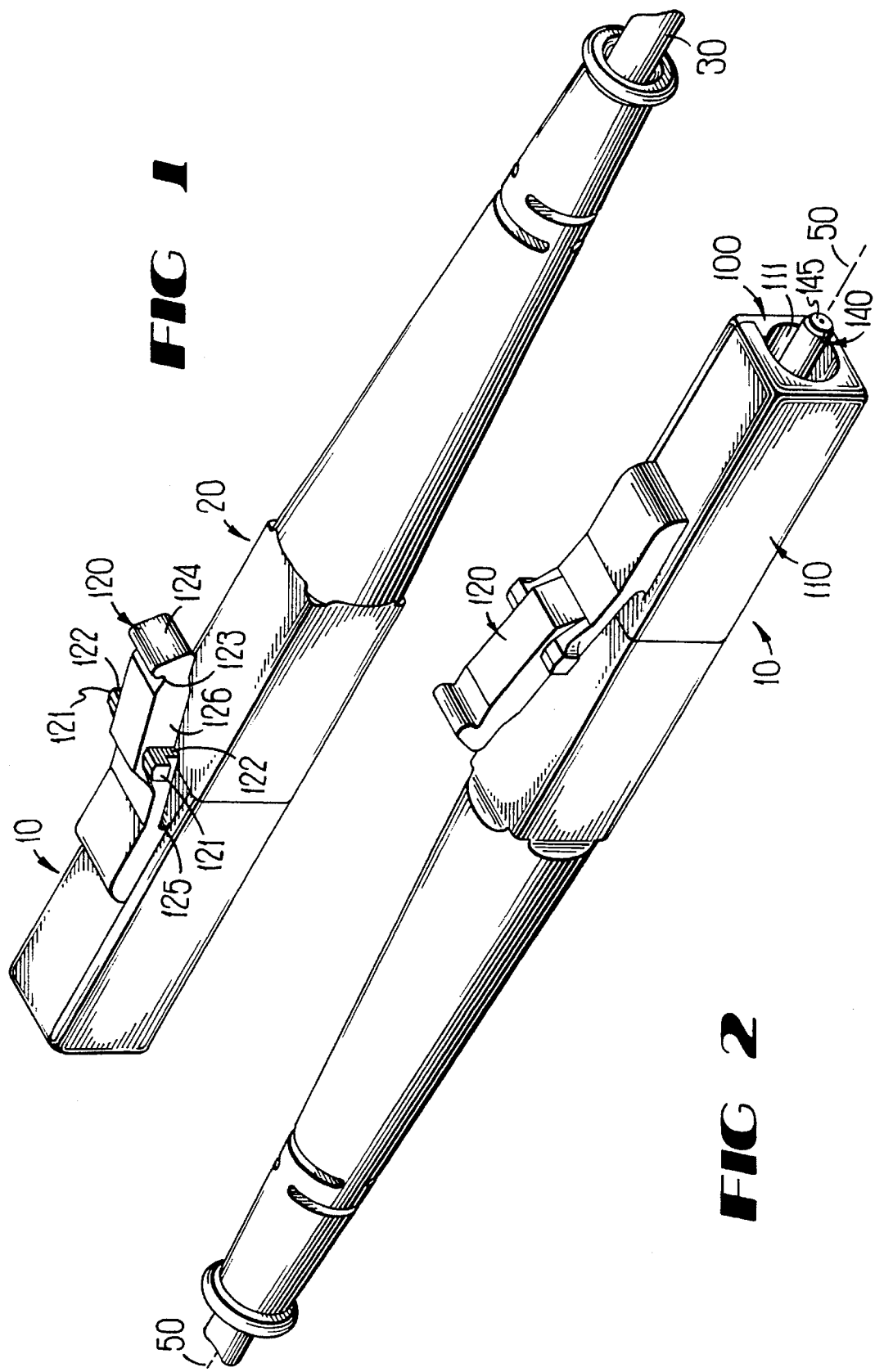

CONNECTOR FOR OPTICAL FIBER

TECHNICAL FIELD

This invention relates to apparatus for making connections between optical devices, and more particularly to a connector for terminating an optical fiber.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, all of the light from one fiber is coupled to the other fiber. This is a particularly challenging task because the light-carrying region (core) of an optical fiber is quite small. In singlemode optical fibers the core diameter is about 8 microns where 1 micron=1 µm= $10^{-3}$ mm. Another function of the optical fiber connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). An optical fiber connector typically includes a small cylinder with a glass or plastic fiber installed along its central axis. This cylinder is interchangeably referred to as a ferrule or a plug.

In a connection between a pair of optical fibers, a pair of ferrules are butted together—end to end—and light travels from one to the other along their common central axis. In this conventional optical connection, it is highly desirable for the cores of the glass fibers to be precisely aligned in order to minimize the loss of light (insertion loss) caused by the connection; but as one might expect, it is presently impossible to make perfect connections. Manufacturing tolerances may approach "zero," but practical considerations such as cost, and the fact that slight misalignment is tolerable, suggest that perfection in such matters may be unnecessary.

One popular design of an optical fiber connector is shown in U.S. Pat. No. 4,793,683; and its basic components comprise a precision molded plastic conical plug having an optical fiber centered therein, a compression spring disposed about a cylindrical portion of the plug, and a retention collar surrounding the plug and spring. The collar includes external threads that enable it to couple with another connector via a fixture having a precision molded alignment sleeve whose shape is best described as "biconic." This design has been superseded by the connector shown in U.S. Pat. No. 4,934,785 which comprises a cylindrical plug, a base member that holds the plug, a compression spring, and a cap that surrounds the plug and spring. In this design, only the cylindrical plug needs to be of high precision and is typically made from a ceramic material. When joining two of these plugs together, an alignment sleeve is used which comprises a split, thin-walled cylinder made of metal, ceramic or even plastic material. This alignment sleeve need not be as precise as the above-described biconic alignment sleeve.

And while the above connectors perform satisfactorily, further improvements are desirable. For example, because of the growing acceptance of optical fiber as the transmission media of choice for television, data, and telephone (multimedia) communications, the need to provide higher density interconnection arrangements has emerged. All of the above-mentioned simplex optical connectors are constructed in such a way that the ability to stack a large number of them together is limited by the need to manually grasp both sides during insertion and removal from a receptacle or coupling device. Known duplex optical connectors, such as the one shown in U.S. Pat. No. 4,787,706, also require manual access to the opposite sides of its housing during removal from the receptacle or coupling device which precludes high density optical fiber interconnection arrays. Furthermore, it is always desirable to reduce cost while still providing a connector that is immediately acceptable to customers. With these latter desires in mind, reference is made to the art of electrical connectors where, perhaps, the most used and accepted connectors are the ones known as RJ11-type plugs/jacks that are typically used in corded telephone products. These connectors have achieved widespread acceptance because they are inexpensive, they operate reliably, and their operation is readily understood by customers. However, because of the high precision and low insertion loss requirements associated with optical interconnections (particularly between singlemode fibers), RJ11-type designs have been unacceptable for optical connectors. Examples of such electrical connectors are shown in U.S. Pat. Nos. 3,761,869 and 3,954,320.

Recognizing the engineering challenge posed by the alignment of two very small optical fiber cores, it is still desirable to provide connectors which are smaller, less expensive, and yet more convenient for customers to manipulate. Such connectors would be of great commercial importance.

SUMMARY OF THE INVENTION

The connector of the present invention includes a fiber-holding structure having an axial passageway for holding an end portion of an optical fiber which terminates in an end face of the structure. The fiber-holding structure is positioned within a housing that includes a first opening for receiving the optical fiber and a second opening for enabling the end face of the structure to protrude therethrough. The housing also includes a spring latch which is positioned on a single side surface thereof which is used to secure the housing to an associated receptacle. The latch moves up and down in a direction which is generally perpendicular to the axial passageway of the fiber-holding structure.

In an illustrative embodiment of the invention, the fiber-holding structure comprises a cylindrical plug and a base member which holds an end portion of the plug. The base member is generally cylindrical, but it includes a flange around its circumference at one end thereof. In this illustrative embodiment of the invention, a two-piece dielectric housing having a generally square cross section is used. One piece comprises a U-shaped channel for receiving the cylindrical plug/base member assembly. A spiral compression spring surrounds the base member with one end of the spring pressing against the flange and the other end pressing against an interior surface of the housing. Preferably, the plug is made from a drawn glass tube whose outer cylinder surface has a circular cross section and whose axial passageway (capillary) is substantially concentric with the outer cylinder surface. Additionally, the flange is adapted to enable the base member to fit into the housing in a number of different stable positions so that fiber eccentricity can be minimized by rotating the base member to orient the fiber eccentricity in a predetermined direction. In the preferred embodiment of the invention, a square flange is used.

BRIEF DESCRIPTION OF THE DRAWING

The invention and its mode of operation will be more clearly understood from the following detailed description when read with the appended drawing in which:

FIG. 1 is a rear, top and left-side perspective view of an optical fiber connector together with a bend-limiting, strain-relief boot;

FIG. 2 is a front, top and right-side perspective view of the optical fiber connector shown in FIG. 1;

DETAILED DESCRIPTION

Figure 3:
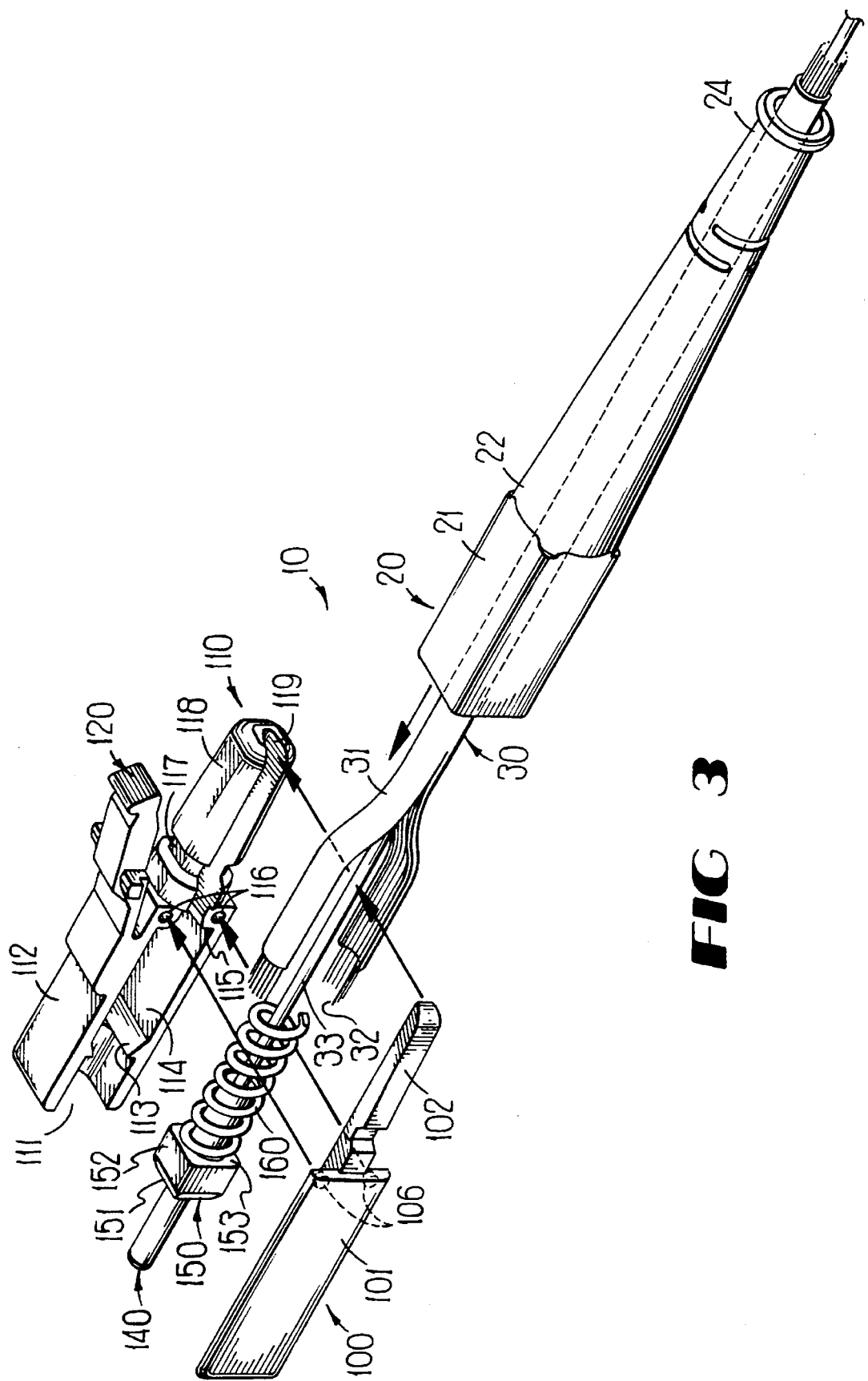
FIG. 3 is an exploded perspective view of the optical fiber connector shown in FIG. 1, illustrating its associated components.

Reference is made to FIG. 1 which shows a rear, top and left-side perspective view of an optical fiber connector 10 which, together with bend-limiting strain-relief boot 20, terminates optical cable 30. This optical fiber connector has a generally rectangular shape with a square cross section. The outside surface of the connector 10 includes a spring latch 120 which is used for securing the connector to an associated receptacle in order to prevent unintended decoupling between the two. Although not required, the connector and latch are molded from a commodity thermoplastic in order to achieve a low-cost, lightweight housing for optical components contained therein. Spring latch 120 is molded into the housing and includes a "living hinge" 125 which allows tab 126 to be moved up and down in a direction which is perpendicular to the central axis 50—50 of connector 10 (see FIG. 2). In this illustrative embodiment of the invention, the connector has a footprint (cross-section dimension) of 4.6 by 4.6 millimeters (mm) that permits higher density interconnections than have been possible heretofore.

FIG. 2 is a front, top and right-side perspective view of the optical connector and strain relief assembly shown in FIG. 1 to disclose additional detail at the front end of the connector. In particular, ferrule 140 is shown protruding from opening 111 of a two-piece assembly comprising housing 110 and cover 100 which have been ultrasonically bonded together after the ferrule 140 and its associated components have been installed in the housing. One of the associated components is a spring which allows the ferrule to move back and forth through the opening 111. An end face 145 of the ferrule comprises a polished flat surface which abuts with the end face of another ferrule in a typical interconnection. The ferrule only protrudes slightly from the front end of the housing in order to protect it from damage if dropped. As will be discussed later, the ferrule is preferably made from glass and needs greater protection than if made from plastic, metal and/or ceramic materials. Because the connector is small and preferably uses lightweight materials, there is little fear that the connector (equipped with a glass ferrule) would be damaged if dropped. The reduced mass correspondingly reduces the force during impact (i.e., F=ma). Finally, it is noted that because other known devices use latches of generally similar construction, the operation of latch 120 is self explanatory—even though such latches have never been used in optical fiber connectors before and reference is made to FIG. 1, once again, for additional discussion of latch 120.

Spring latch 120 is a relatively simple device that can be constructed in a number of different ways. In the preferred embodiment of the invention the latch is completely external to the connector 10, although it is readily possible within the spirit and scope of the invention to construct a latch that deflects into the body of the connector (i.e., in the same manner that latch 410 deflects into receptacle 40 in FIG. 4). Spring latch 120 includes a pair of shoulders 121—121 that are positioned on opposite sides of a tab 126 and automatically deflected downward during insertion into an associated receptacle (see FIG. 4). Spring latch 120 is then returned to its original position by its own restorative force. Each of the shoulders 121—121 includes a vertical surface 122 which interacts with a corresponding vertical surface 432 within the receptacle to hold the connector 10 and receptacle together—i.e., until the latch is once again deflected downward and the connector is partially ejected from the receptacle due to the force from an internally disposed spring 160 (see FIG. 5), and pulled from the receptacle. It is noted that latch 120 is a cantilever beam which is made from a material that can be deformed somewhat by the application of force; but then returns to its original shape after the force is removed. A variety of metals or thermoplastic materials are suitable. A fingernail groove 123 is positioned at the back end of latch 120 along with a tab head 124 that facilitates manipulation of latch 120.

FIG. 3 is an exploded perspective view of the optical connector shown in FIG. 1, illustrating its associated components. In particular, FIG. 3 discloses construction details of a connector 10 which includes housing 110, cover 100, and a fiber-holding structure comprising ferrule 140, base member 150, and spring 160 which is disposed about the base member. Although the fiber-holding structure is shown as a two-piece assembly that is ultrasonically welded together, for example, it can be constructed as a one-piece unit or a multi-piece assembly. Of particular interest is housing 110 which is a generally U-shaped device having a cavity 114 for receiving the fiber-holding structure. Once the fiber-holding structure is inserted into the cavity of housing 110, cover 100 is bonded thereto. Cover 100 includes pins 106—106 which mate with holes 116—116 in housing 110 for alignment. Once joined together, the front end of the connector has a generally square shape which fits into a receptacle 40 (see FIG. 4, 5) that is shaped to receive same. Top surface 112 and left-side surface 101 comprise two of the four outside surfaces that form the front end of connector 10. The back end of connector 10 is conically shaped with four flat areas, spaced 90° apart, that are used to position the back end of the connector within the front end of strain-relief boot 20. Top surface 118 and left-side surface 102 comprise two of the four flat surfaces at the back end of connector 10. Housing members 100, 110 include a plurality of interior surfaces that define cavity 114 which surrounds the fiber-carrying structure. The connector includes a first opening 119 at its back end which receives an optical cable 30 and a second opening 111 at its front end for enabling the end face of the fiber-carrying structure to protrude therethrough. These openings 111, 119 extend into cavity 114 and are positioned at opposite ends of connector 10. Housing members 100, 110 are molded from a thermoplastic material and have been designed to be molded for straight pulls without cams to reduce mold and part costs. It is noted that spring latch 120 is molded into the top surface 112 of the housing 110.

Similar to the outside surface of the connector, interior cavity 114 also has a generally square shape. A flange 113 within housing 110 includes a sloped surface which is shaped to interface with chamfered surface 151 of flange 152 on the base member 150. Moreover, flange 152 is shaped to enable it to be supported within cavity 114 in several different stable positions—each one having a different rotational orientation with respect to the central axis of the fiber-holding structure. In the preferred embodiment of the invention, flange 152 is square and thus provides 4 stable positions for orienting the fiber-carrying structure so that fiber eccentricity (discussed below) can be accommodated. Compression spring 160 surrounds the back cylindrical portion of base member 150 and presses against surface 153 of the flange and against surface 115 within the cavity 114 of housing member 110. Spring 160 urges the end face of the fiber-holding structure through opening 111.

Ferrule 140 may be a glass, metal, ceramic or plastic cylinder having a narrow passageway (about 126 μm in diameter) through its central axis for receiving an end portion of an optical fiber. In a preferred embodiment of the invention the ferrule is made from a borosilicate glass. The ferrule has an outer diameter of about 1.25 mm and a length of about 7.0 mm. In the construction of an optical cable 30, a thin glass fiber is typically coated with two layers of ultraviolet-curable materials (polyacrylate for example) for protection. The coated fiber is then covered with a thermoplastic having sufficient stiffness to preclude fiber buckling and is referred to as a buffered fiber. To withstand tensile forces that might otherwise fracture the buffered fiber, the cable is constructed with a load-bearing portion in the form of strength members 32 that surround the buffered fiber. Elongated slender polymeric fibers of high tensile strength, such as aramid yarn, are suitable for use in this regard. An outer jacket 31 comprising polyvinyl chloride, for example, surrounds the buffered fiber and strength members to complete the construction of optical cable 30.

These layers of different materials are all stripped from an end portion of the glass fiber prior to its insertion into ferrule 140. An adhesive is injected into the passageway through the central axis of ferrule 140. Then the uncoated portion of the optical fiber is inserted into the passageway of the ferrule and adhesively attached. The spring 160 is pre-compressed on the ferrule/base member subassembly 140/150 with cable, and is placed into housing 110. Housing cover 100 is then installed and ultrasonically bonded, for example. Strength members 32 (e.g., aramid fibers) of the cable 30 are adhesively attached to the back end of connector 10 and pressed into a circumferential groove 117 by a mating flange 25 (see FIG. 5) within the strain-relief boot 20. Both the cable jacket 31 and the strength members 32 are "sandwiched" between the boot and the back end of connector 10. A suitable adhesive for joining the strength members together with the strain-relief boot and the connector is Hysol 151—a commercially available, two-part epoxy. When an axial pull of 15 pounds is applied to cable 30, it is desirable that it remain attached to connector 10. And while adhesives are preferable, a crimping sleeve may alternatively be used to join the strength members 32, and/or outer jacket 31 of the cable, to the connector.

Strain-relief boot 20 is about 38 mm long and includes a generally square portion at its front end whose sides are each about 4.6 mm. It is made from a suitably compliant material so that its back portion can be bent in a direction that is perpendicular to its longitudinal axis. In the preferred embodiment of the invention, the strain-relief boot is made from a thermoplastic rubber such as Santoprene® elastomer which is commercially available from Advanced Elastomer Systems, LP. So that the bending properties of the boot 20 are suitable for limiting the bend radius of the enclosed cable 30 to no less than 20 mm over a prescribed load range, the preferred thermoplastic rubber is designated 253-50 and has a hardness rating of 50 D. Additionally, a portion of strain-relief boot 20 is conically shaped and tapers from a maximum diameter of about 5.6 mm at one end 22 to a minimum diameter of about 3.0 mm at the other end 24. Not only does the boot 20 provide strain relief for cable 30, but it also insures that the cable can withstand repeated bends after interconnection without undue stress being imparted to the glass fiber.

Figure 4:
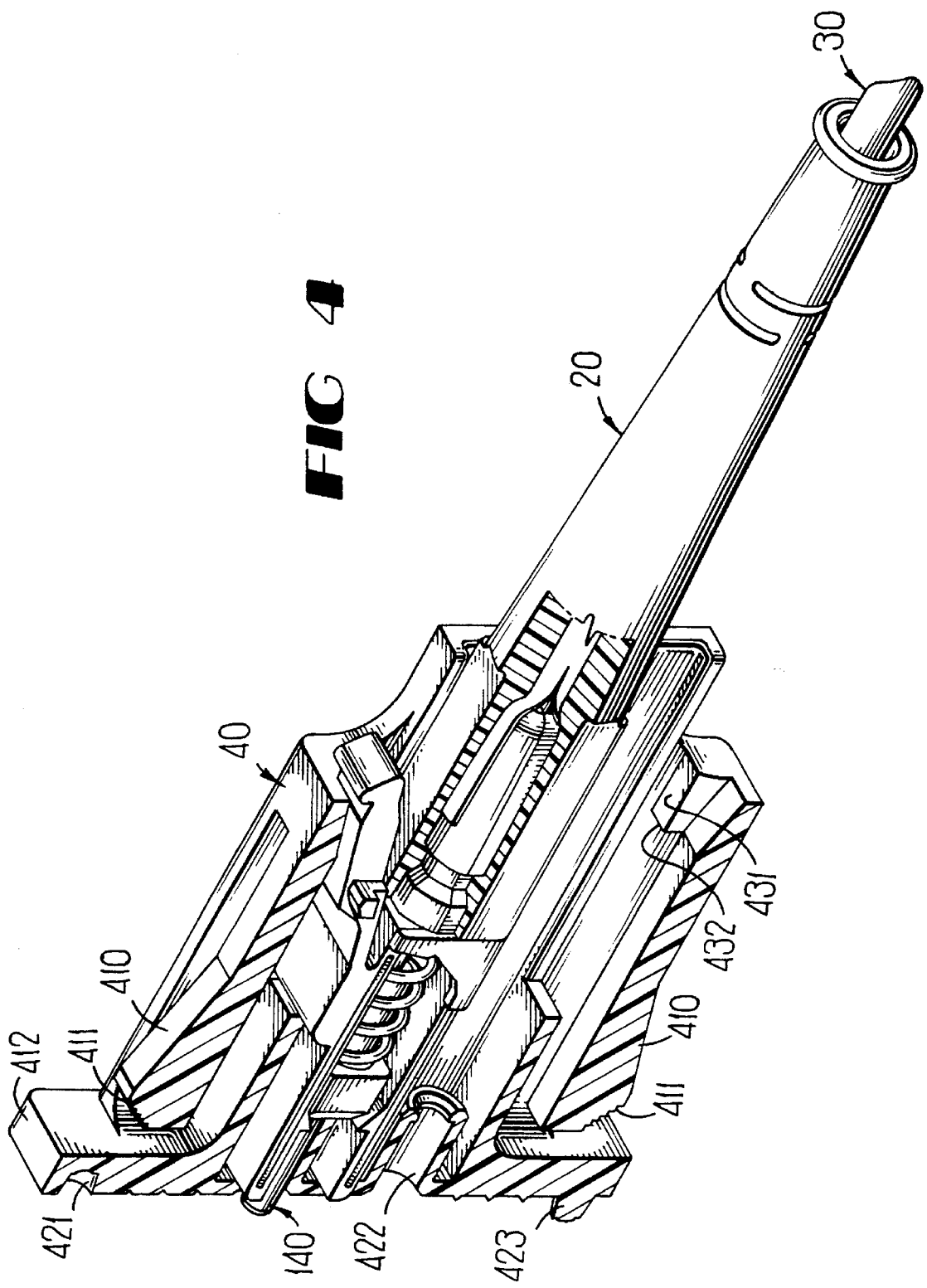
FIG. 4 is a perspective view of the optical fiber connector inserted within a receptacle that accommodates two such connectors. The receptacle is shown in cross section, and the connector is shown in partial cross section for clarity.

FIG. 4, 5 shows the inventive connector positioned within a duplex receptacle 40 which accommodates two such connectors. Receptacle 40 installs in a rectangular opening of a flat panel 60 by pushing its narrow end through the opening. The receptacle is held therein by grooves 411 in spring latch 410, and may be removed from the panel by squeezing the spring latch and pushing the receptacle forward. Typically, two identical receptacles 40—40 are joined by bonding their flanges 412 together end-to-end before insertion into the panel. Mating portions 421, 423 are used to assure proper alignment. Nevertheless, so that the ferrules 140 within the connectors are perfectly aligned, specially designed alignment sleeves 500 are installed in cylindrical openings 422 before the receptacles are joined. Suitable alignment sleeves, made from metal, ceramic or even plastic material, are well known in the art and are not discussed further.

Figure 5:
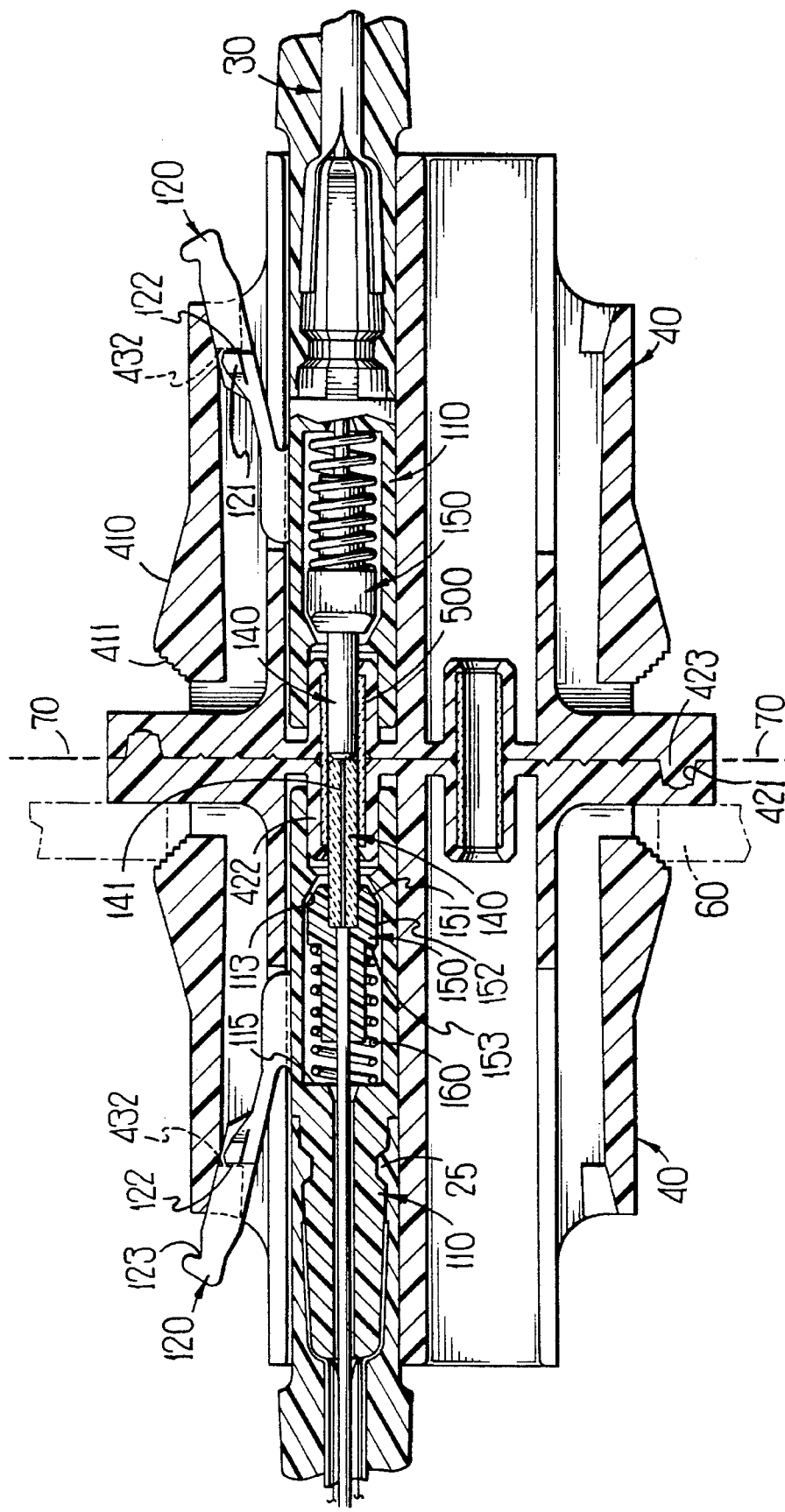
FIG. 5 shows a cross section view of a pair of interconnected optical fiber connectors and receptacles.

FIG. 5 discloses an almost-symmetrical interconnection between a pair of optical fibers meeting at optical plane 70. An while a connector-to-connector example is shown, it is clear that the connector can be joined to any optical device. For improved clarity, the connector and cable shown in the left-half portion of this figure are cross-sectioned, while the connector and cable shown in the right-half portion are not. Nevertheless, because this drawing is nearly symmetrical, what is said regarding the left-half portion applies to the right-half portion as well. Ferrules 140 are coaxially aligned by inserting them into an alignment sleeve 500 which is held within cylindrical opening 422 of the receptacle. Each ferrule is adhesively held within a mating opening of base member 150, and each ferrule includes an axial passageway 141 through which an end portion of an optical fiber (whose coatings have been removed) extends. Each compression spring 160 urges its associated base member 150 and ferrule 140 toward the other base member and ferrule by simultaneously pressing against interior surface 115 of housing member 110 and against a surface 153 of flange 152. Flange 152 includes a chamfered surface 151 along its front side which rests against a sloped surface on flange 113 within housing member 110.

This connector is considered a "floating" design in which the two ferrules are spring loaded and supported by alignment sleeve 500 within receptacle 40. When the first connector is inserted into the left-side receptacle, its associated ferrule 140 overtravels the optical plane (transverse centerline) 70 between the receptacles 40—40. When the second connector is inserted into the right-side receptacle, and contact between the end faces 145—145 (see FIG. 2) of the two ferrules is made, the first ferrule is pushed backwards and mating surfaces 113, 151 are separated. The first ferrule continues moving backward until equilibrium is reached between the spring loading of the two ferrules provided by the compression springs 60—60.

Of particular interest in FIG. 5 is spring latch 120 which moves downwardly while being inserted into the receptacle 40, but then springs back (upwardly) after insertion is complete. The downward movement of the latch is caused by interference (during insertion) between shoulder 121 on the latch and surface 431 on the receptacle (see FIG. 4). Thereafter, vertical surface 432 on the receptacle interacts with vertical surface 122 on the shoulder 121 of latch 120 to lock the connector into the receptacle. Removal of the connector is readily accomplished by manually depressing spring latch 120 downwardly (i.e., in a direction which is perpendicular to the axial passageway) and pulling cable 30 or strain-relief boot 20. Because of the relatively small dimensions associated with the latch, fingernail groove 123 is useful. Even though each receptacle 40 only shows a single optical fiber connector inserted therein, it accommodates a pair of such connectors in a space-efficient manner. For example, when two connectors are inserted into the same receptacle 40, one above the other, their latches are positioned outwardly to improve user accessibility. And it is the desire to pack a large number of optical fiber connectors into a small area which has provided significant incentive to improve the various prior art connectors shown in FIG. 6.

Prior Art

Figure 6:
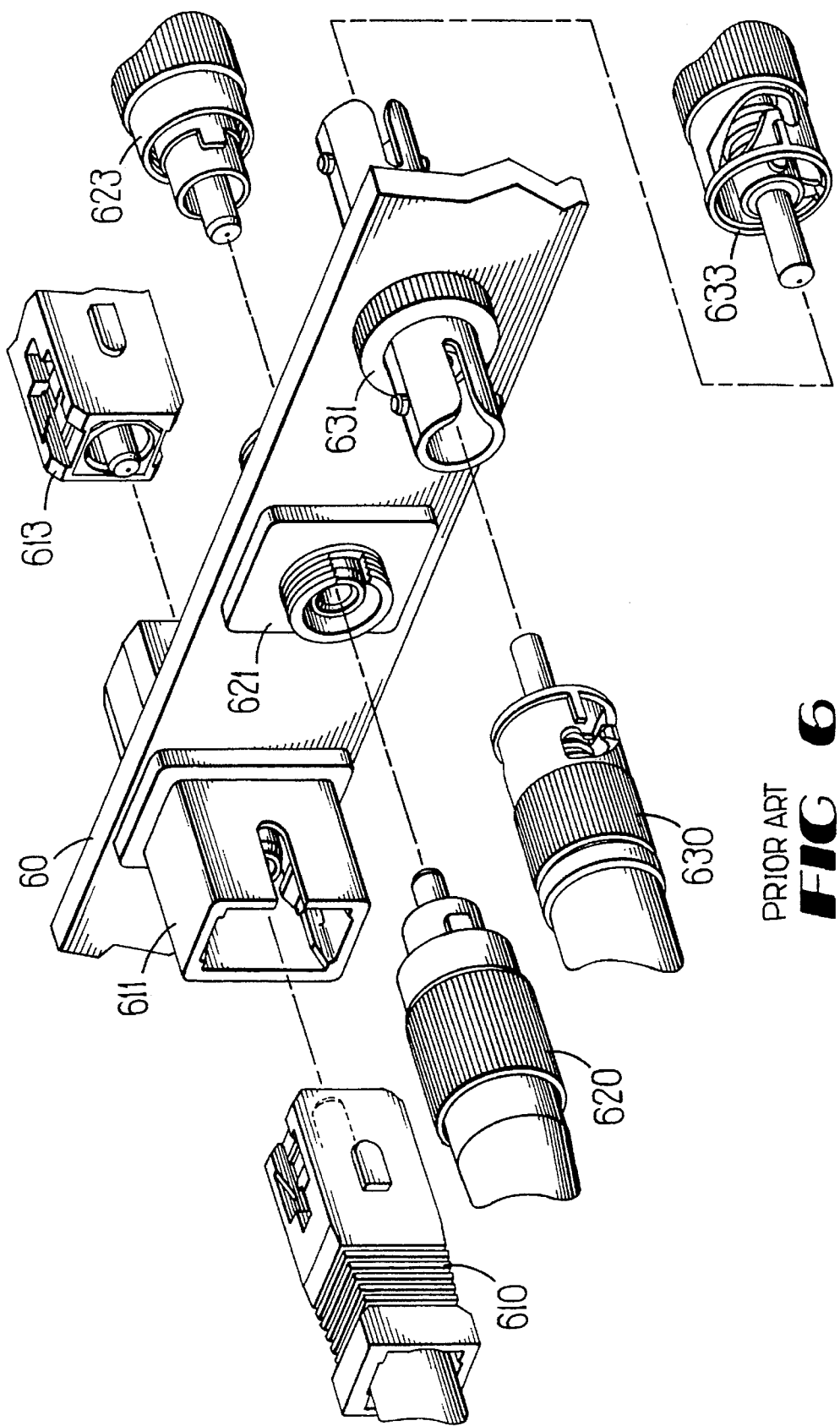
FIG. 6 discloses three different prior art optical fiber connectors.

FIG. 6 discloses an number of known optical fiber connectors 610, 620 and 630 interconnected via appropriate receptacles 611, 621 and 631 respectively. Optical connectors 610, 613 are commonly referred to as SC-type connectors and are connected together via receptacle 611 which extends through an appropriately shaped opening in flat panel 60. Insertion and removal of SC-type connectors generally requires that the user be able to fit his/her fingers onto its opposite sides. In the event that a large number of such connectors need to be mounted in close proximity, the need to touch both sides of the connector reduces overall packing density. Optical connectors 620, 623 (FC-type) also require that the user place his/her fingers onto both sides of the connector to fully rotate it several times during insertion and removal from receptacle 621. An improvement is offered by connectors 630, 633 (ST-type) which only require a small amount of rotation to insert and remove it from receptacle 631.

Accordingly, the present invention provides improved packing density over known optical connectors because its interlocking mechanism can be operated by merely pressing a spring latch, which is located on a single side surface of the connector housing, toward its central axis with no special tool required.

Glass Ferrule

Although not required in the practice of the present invention, the use of a drawn glass ferrule is preferred for a variety of reasons. The high hardness and strength of ceramic materials, which are typically used for making ferrules, is not required. Indeed, due to the relatively soft nature of the glass ferrule (which frequently is softer than the $SiO_2$-based fiber held therein), standard polishing of the plug end face typically results in a slightly convex plug end face, with possibly a slightly (on a microscopic scale) protruding fiber. This naturally occurring configuration makes possible very efficient fiber coupling. Not only does the resulting intimate fiber-to-fiber contact result in low optical loss, but these connectors also have exceptionally low reflection of signal radiation. Reflection levels lower than −55 dB are commonly observed in prototypical connectors, and low reflection levels are desirable. Reflectance is a function of the material index of refraction and the index difference of the interfaces, and is given by the equation:

Reflectance=−10 log $[(n_0-n_i)^2/(n_0+n_i)^2]$

For example, in a glass-to-air interface ($n_0$= 1.0 for air, and $n_1$= 1.47 for glass) the reflectance is approximately 14.4 dB (3.6%). And for two plugs with slight differences in $n_i$,(i.e., $n_1$= 1.48 vs 1.47) the reflectance is −49 dB (0.0011%); and for two plugs −46 dB (0.0022%).

On the other hand, standard polishing of the relatively hard ceramic ferrule end faces (with an optical fiber held in the ferrule) typically results in preferential removal of material from the fiber such that the fiber end face frequently becomes slightly concave. This in turn results in relatively poor coupling between fibers. Furthermore, the relatively hard debris from the polishing of the ceramic plug end face frequently damages the fiber end face. This damage may be one factor in the observed relatively high reflection of the signal radiation in connectors that use the relatively hard ceramic plugs. Observed reflection levels are typically in the −45 dB range—about 10 dB higher than in otherwise identical connectors that use glass ferrules. As is well known, signal reflections from such discontinuities as connectors are a serious problem in high capacity optical fiber systems since the reflected power can interfere with the proper operation of singlemode lasers.

Moreover drawn glass ferrules are less expensive than ceramic ferrules, and can result in connectors that have better thermal properties and dimensional tolerances. For example, using drawn glass ferrules, it is routinely possible to fabricate low loss (typically, <0.3 dB) connectors for the more demanding singlemode fibers. It is emphasized that an approximately 1 μm misalignment between the fiber cores typically introduces approximately 0.23 dB loss for depressed clad, singlemode fiber with an 8.8 μm mode field diameter. The required alignment precision thus is extraordinary.

Eccentricity

Alignment variations between a pair of interconnected ferrules are principally attributable to a parameter known as "eccentricity" of the optical fiber core with respect to the ferrule. Eccentricity is defined as the distance between the longitudinal centroidal axis of the ferrule at an end face of the ferrule and the centroidal axis of the optical fiber core held within the passageway of the ferrule. Generally, the passageway is not concentric with the outer cylindrical surface which is the reference surface. Also, the optical fiber may not be centered within the ferrule passageway and the fiber core may not be concentric with the outer surface of the fiber. Hence, the eccentricity is comprised of the eccentricity of the optical fiber within the ferrule passageway and the eccentricity of the passageway within the ferrule.

If one could view the end portion of a "lit" optical fiber, which might not be a safe thing to try, what would be seen is a circle with a dot of light somewhat displaced from the exact center of the circle. Eccentricity can be understood as a two-dimensional vector having magnitude and direction components. The "magnitude component" of the eccentricity vector is the straight line distance between the center of the circle and the dot of light, while the "direction component" of the eccentricity vector is the angle made by that straight line with respect to the X-axis of a 2-dimensional cartesian coordinate system whose origin is at the center of the circle. It is noted that ferrules used in conventional optical connectors (i.e., ST, SC and FC) have a 2.5 mm diameter while the ferrule used in a preferred embodiment of the present invention has a diameter which is half that size. The use of a drawn glass ferrule takes advantage of this situation. As the glass preform is drawn smaller to make the reduced-size ferrule, the magnitude component of the eccentricity vector is proportionally reduced—which improves precision.

Rotating one of two interconnected ferrules typically changes the relative position of the fibers held within the passageway because of the eccentricity of the optical fiber core with respect to the ferrule. Because it is very difficult to control the eccentricity of the optical fiber core in the ferrule in which it is terminated, it is difficult to achieve desired losses of 0.1 dB or less in singlemode fibers without maintaining close tolerances so that the opposed cores are aligned to within about 0.7 μm. This, of course, increases the manufacturing cost. If the total eccentricities of the two optical fiber ends to be joined are identical, or at least very nearly so, then a low-loss connection can be achieved by merely rotating, within the alignment sleeve, one ferrule with respect to the other, until maximum coupling is observed.

The present invention enables fiber eccentricity to be compensated through the use of a square flange 152 on base member 150 (see FIG. 3) which enables the base member to be installed in housing member 110 in one of four different rotational positions (0°, 90°, 180°, 270°). The particular position selected is determined during fabrication of the connector 10 by measuring fiber eccentricity, rotating the base member by an amount based on the measurement, and then inserting the base member into the housing 110 in such a manner that fiber eccentricity is always aligned with a predetermined feature of the housing. For example, eccentricity is always aligned with spring latch 120.

Although a particular embodiment of the present invention has been shown and described, various modifications are possible within the spirit and scope of the invention. These modifications include, but are not limited to, the use of different materials in the construction of a connector. For example, although glass ferrules are preferred, the use of ceramic, plastic or metal ferrules is possible. And although the fiber-holding structure preferably comprises a ferrule and a base member, it may be a one-piece structure. Additionally, the ferrule need not be cylindrical and can be designed to hold a plurality of fibers in a predetermined array. Further, even though the disclosed spring latch is molded into the housing, it may be a separate part which attaches to the housing and made, for example, from metal. Moreover, the spring latch itself may be designed to move into the body of the housing itself. Finally, the present invention accommodates the use of plastic fiber as well as glass.

We claim:

1. A connector for terminating an optical fiber comprising:
    a fiber-holding structure having an end face in which an associated fiber is to terminate the holding structure including an axial passageway which terminates in the end face and which is adapted to receive an end portion of the associated fiber;
    a housing having internal surfaces that define a cavity and surround the fiber-holding structure, the housing including a first opening for receiving an optical fiber and a second opening for enabling the end face of the holding structure to protrude therethrough, said openings extending into the cavity and being positioned at opposite ends of the housing; and
    a manually operated latch for securing the housing to an associated receptacle to preclude unintended decoupling therebetween, the latch being positioned on a single side surface of the housing and movable in a direction which is perpendicular to the axial passageway, said latch comprising a cantilever beam having its fixed end positioned toward the second opening of the housing.

2. The connector of claim 1 wherein the fiber-holding structure includes a spring member which interacts with the housing to urge said end face through the second opening in the housing.

3. The connector of claim 1 wherein the fiber-holding structure comprises
    a cylindrical plug that includes the end face in which the associated fiber is to terminate and an axial passageway which terminates in said end face, said passageway being adapted to receive an uncoated end portion of the associated fiber; and
    a base member for holding an end portion of the plug, said base member including an axial passageway which is collinear with the axial passageway of the plug.

4. The connector of claim 3 wherein the cylindrical plug has a diameter of about 1.25 millimeters.

5. The connector of claim 3 further including an annular spring which is disposed about the base member and which presses against a flange thereof, said spring also pressing against one of the internal surfaces of the cavity.

6. The connector of claim 3 wherein the cylindrical plug comprises a drawn glass tube whose outer cylinder surface has a circular cross section and whose axial passageway is substantially concentric with the outer cylinder surface.

7. The connector of claim 6 wherein the glass tube comprises borosilicate glass.

8. The connector of claim 1 wherein the fiber-holding structure is adapted to be held within the housing in a plurality of stable angular positions; whereby the angular position of the fiber-holding structure with respect to the housing can be varied.

9. The connector of claim 8 wherein the fiber-holding structure includes a square flange which is adapted to be held within the housing in four stable angular positions.

10. The connector of claim 1 wherein the housing comprises first and second interconnecting members, the first interconnecting member being generally U-shaped with a channel for receiving the fiber-carrying structure, the second interconnecting member being generally flat and shaped to mate with the first part, said first and second interconnecting members substantially enclosing the fiber-holding structure when they are joined together.

11. The connector of claim 10 wherein the first and second interconnecting members are made from a dielectric material.

12. The connector of claim 11 wherein the dielectric material comprises thermoplastic.

13. In combination, an optical cable and a connector, the optical cable comprising a glass fiber enclosed within a plastic buffer material; and the connector comprising (i) a fiber-holding structure having an axial passageway which receives the optical fiber and which terminates in a planar end face that is perpendicular to the passageway, (ii) a housing having internal surfaces that define a cavity and surround the fiber-holding structure, the housing including a first opening at its back end which receives the optical cable and a second opening at its front end that enables the end face of the fiber-holding structure to protrude therethrough, said openings extending into the cavity and being positioned at opposite ends of the housing, and (iii) a manually operated latch for securing the housing to an associated receptacle to preclude unintended decoupling therebetween, said latch being positioned on a single side surface of the housing and movable in a direction which is perpendicular to the axial passageway, said latch comprising a cantilever beam having its fixed end positioned toward the front end of the housing.

14. The combination of claim 13 wherein the optical cable further comprises a plurality of filamentary strength members surrounding the buffered fiber and a plastic jacket surrounding the filamentary strength members.

15. The combination of claim 13 wherein the fiber-holding structure includes an annular spring which interacts with the housing and urges the end face of the fiber-holding structure through the second opening in the housing.

16. The combination of claim 14 further including a strain-relief boot having a longitudinal passageway which holds the optical cable, a front portion of the strain-relief boot surrounding the back end of the housing and capturing the filamentary strength members of the optical cable therebetween; whereby tensile forces applied to the optical cable are transferred to the connector.

17. The combination of claim 16 wherein the strain relief boot is adapted to limit the minimum bending radius of the optical cable in the region where it joins the connector.

18. A connector for terminating an optical fiber including a fiber-holding structure which terminates in an end face and is adapted to receive an end portion of the optical fiber.

CHARACTERIZED BY:

a housing having a plurality of internal surfaces that define a cavity and surround the fiber-holding structure, the housing including a first opening for receiving an optical fiber and a second opening for enabling the end face of the fiber-holding structure to protrude therethrough, said openings extending into the cavity and being positioned at opposite ends of an axial passageway through the housing; and a manually deformable latch for securing the housing to an associated receptacle in order to preclude unintended decoupling therebetween, the latch being positioned on a single side surface of the housing and movable in a direction which is perpendicular to the axial passageway, said latch comprising a cantilever beam having its fixed end positioned toward the second opening of the housing.

19. The connector of claim 18 wherein the fiber-holding structure includes a compression spring which presses against one of the interior surface of the housing to urge the end face of the fiber-holding structure through the second opening in the housing.

20. An optical fiber connector for effecting optical end-to-end coupling between two optical fibers, each of which terminates in a ferrule having a precision cylindrical outside surface, one end of the ferrule being held within an opening of a base member, said base member being generally cylindrical and having a flange which is disposed around the circumference of the base member and interacts with one end of an annular spring which is also disposed around the base member, said ferrule and base member and spring being mounted within a dielectric housing that is

CHARACTERIZED BY:

a plurality of internal surfaces that surround the ferrule and base member and spring, the housing including a first opening for receiving an optical fiber and a second opening for enabling an end portion of the ferrule to protrude therethrough, said openings extending into the cavity and being positioned at opposite ends of the housing; and a spring latch for securing the housing to an associated receptacle in order to preclude unintended decoupling therebetween, the latch being positioned on a single side surface of the housing and being manually movable in a direction which is perpendicular to a longitudinal central axis of the cylindrical ferrule, said latch comprising a cantilever beam having its fixed end positioned toward the second opening of the housing.

21. The connector of claim 20 wherein the latch comprises a cantilever beam which is attached to the single side surface of the housing, and includes a groove at the free end thereof to facilitate manual operation.

* * * * *